(12) United States Patent
Chang et al.

(10) Patent No.: US 9,965,661 B2
(45) Date of Patent: May 8, 2018

(54) SENSORY TOTEM BADGE CAPABLE OF TRANSMITTING INDIVIDUALIZED INFORMATION

(71) Applicant: PORTWELL INC., New Taipei (TW)

(72) Inventors: Lin-Heng Chang, New Taipei (TW); Kuang-Hung Cheng, New Taipei (TW); Chih-Kae Guan, New Taipei (TW)

(73) Assignee: PORTWELL INC., New Taipei (TW)

( * ) Notice: Subject to any disclaimer, the term of this patent is extended or adjusted under 35 U.S.C. 154(b) by 0 days. days.

(21) Appl. No.: 15/364,674

(22) Filed: Nov. 30, 2016

(65) Prior Publication Data

US 2017/0316234 A1 Nov. 2, 2017

(30) Foreign Application Priority Data

Apr. 29, 2016 (TW) .............................. 105206182 A

(51) Int. Cl.
 *G06K 7/10* (2006.01)
 *G06Q 30/02* (2012.01)
 *G09F 3/02* (2006.01)
 *G09F 3/00* (2006.01)

(52) U.S. Cl.
 CPC ..... *G06K 7/10366* (2013.01); *G06Q 30/0241* (2013.01); *G09F 3/02* (2013.01); *G09F 3/0297* (2013.01)

(58) Field of Classification Search
 CPC ................ G06C 30/0241; G06C 90/00; G06K 19/07713; G06K 7/10237; G06K 7/10118; G06K 7/10366; G08B 13/2417; G08B 13/246; G06Q 30/0267
 USPC ......................................................... 340/10.6
 See application file for complete search history.

(56) References Cited

U.S. PATENT DOCUMENTS 9,129,310 B1 * 9/2015 Lee .................... G06Q 30/0241
2015/0254722 A1 9/2015 Lee et al.

* cited by examiner

*Primary Examiner* — Ali Neyzari
(74) *Attorney, Agent, or Firm* — Muncy, Geissler, Olds & Lowe, P.C.

(57) ABSTRACT

A sensory totem badge capable of transmitting individualized information and includes: a totem badge body attached or sewed onto an object surface; an e-tag, installed to the totem badge body, and including an NFC chip and an NFC coil; and a totem individualized information, stored in the e-tag or a cloud server; such that when a mobile sensing device is near the e-tag of the totem badge body, the implication represented by a totem on the totem badge body, the story behind it, or private words can be read. Therefore, the totem badge body is given with intangible specificity and commemoration to achieve higher value and sense of technology.

16 Claims, 6 Drawing Sheets

SENSORY TOTEM BADGE CAPABLE OF TRANSMITTING INDIVIDUALIZED INFORMATION

FIELD OF THE INVENTION

The present invention relates to a badge assembly, and more particularly to a totem badge that allows us to know about the actual content represented by the totem badge and the commemorative features and values that trace the original source of the totem badge.

BACKGROUND OF THE INVENTION

1. Description of the Related Art

Each totem attached to an object such as clothing, hat, and backpack generally comes with a special meaning, and it also serves as an item expressing personality and supporting a specific organization in addition to serving as a badge, an accessory or a decoration. For example, each NBA team has its die-hard fans, and each NBA logo may vary with time, but each totem or team badge has stories at its time. Regardless of good or bad stories, they are unforgettable memory. In addition, Olympic badge has a history over hundred years, and a reporter had made the following comment on the importance of the Olympic badge at its first time showing up in the Athens Olympic Games in 1896. The "Olympic Games" is a generation-to-generation cultural event, but the custom of exchanging badges in the Olympic Games is a derived culture. Without the badge exchange, the Games will have one cultural heritage less".

In recent years, many fashion brands have added a badge element to the 80's and 90's, but the badge element does not necessarily represent the element of that era, and it may just be beautiful and becomes a fashion culture or an attitude.

In addition, there are various types of badges including an honorable badge representing a nation, a military badge representing an army, or a contributory badge representing an organization, so that the badge shows a wearer's identity, profession, as well as awards and recognitions. Badges have their own glorious stories and historical tracks. For example, people nowadays are used to traveling around the world and the badge with sceneries of local features or commemorative values becomes an item generally bought as a souvenir for oneself or relatives and friends.

Although present existing badges come with different sizes and styles, yet these badges just show the visual implication of the item (or the badge itself) and fail to fully record and convey its substantial meaning, implication and commemorative value. As time goes by, the feelings and joy of a gift recipient become less and less when compared with the time of receiving the badge, and only a stiff feeling of touching the badge by fingers and the fuzzy memory remained in mind are left.

As science and technology advance, a near field communication (NFC) technology is applied to transmit data between electronic devices, and these applications include those of an IC card (including a credit card for shopping), IPASS, access security and control, and a ticket. Since near field communication (NFC) adopts an RF domain for touching a card reader to obtain power supply, therefore the NFC has the advantage of continuing its operation even when the card no longer has power. If the near field communication (NFC) technology is combined with the aforementioned badge, and the receiving and displaying functions of a portable electronic device (such as a mobile phone, a flat PC, a smart wearable device, etc) are used, then the badge will be given with the functions of representing the implication, commemorative information or related recordings of a trip, which may be in form of a text, a sound, a short film, a picture file, or even an URL website record.

When the badge is combined with the near field communication (NFC) and the electronic device are used for transmitting information, an issue of privacy or security may arise. In order words, an unauthorized person may access and display the information of the badge owner through another person's mobile phone or flat PC, and it is necessary to prevent unauthorized accesses. Therefore, it is an important subject for related manufacturers and designers to overcome the drawbacks of the conventional badges that fail to exchange information between one another or incur the privacy and security issues.

In view of the drawbacks of the conventional badges and their applications, the inventor of the present invention conducted extensive researches and experiments, and finally developed a sensory totem badge capable of transmitting individualized information, and such badge is meaningful, unique, convenient and secured, and most importantly overcomes the drawbacks of the prior art.

2. Summary of the Invention

Therefore, it is a primary objective of the present invention to provide a sensory totem badge capable of transmitting individualized information, which records and expresses the substantial content and commemorative value of the badge and has the convenience of receiving and displaying information, so as to improve the application value of the badge.

Another objective of the present invention is to provide a sensory totem badge capable of transmitting individualized information, wherein the badge can transmit a text, a sound, a short film, a picture and an URL website, and the gift sender may connect to a cloud device through the URL website to update the content of information repeatedly.

Another objective of the present invention is to provide a sensory totem badge capable of transmitting individualized information, and a confidentiality protection measure is provided for the badge and the transmission channel of the badge wearer to prevent unauthorized persons to receive and read the individualized information, so as to achieve a better effect of privacy and security.

To achieve the aforementioned and other objectives, the present invention provides a technical measure comprising: a totem badge body, formed, attached, or sewed onto an object surface; an e-tag, installed to the totem badge body, and comprising an NFC chip and an NFC coil; and a totem individualized information, stored in the e-tag; thereby, when a mobile sensing device approaches the e-tag of the totem badge body, the mobile sensing device can read the content of the e-tag of the totem badge body and the stories behind it, so that the totem badge is given with commemoration, value, and sense of technology.

Wherein, the e-tag further comprises a private authentication module, and the private authentication module which requires a password inputted by the mobile sensing device and authenticated correctly before the content of the e-tag including the totem individualized information can be read.

To achieve the aforementioned and other objectives, the present invention also provides another technical measure comprising: a totem badge body, attached, sewed, or formed onto an object surface; an e-tag, installed to the totem badge body, and comprising an NFC chip and an NFC coil; and a totem individualized information, stored in a cloud server, and the cloud server having at least one individualized information corresponsive to access authentication data of the e-tag of the totem badge body; thereby, when a mobile sensing device approaches the e-tag of the totem badge body, the mobile sensing device can read the content of the e-tag of the totem badge body and the stories behind it, so that the totem badge is given with commemoration, value, and sense of technology.

Wherein, the totem badge body is in form of a sheet or directly stitched or sewed onto an object.

Wherein, the mobile sensing device is coupled to a cloud server through a communication unit.

Wherein, the cloud server further comprises a badge authentication module for receiving and authenticating a password transmitted by the mobile sensing device.

Wherein, the cloud server further comprises a badge authentication module for receiving and authenticating an authentication code transmitted by the mobile sensing device.

Wherein, the communication unit is a WiFi module or a mobile network module such as a 3G or 4G mobile network module.

Wherein, the totem individualized information includes a text, a sound, a short film, a picture or at least one URL website.

Wherein, the cloud server further stores totem individualized information corresponsive to the accessed authentication data of the e-tag of the totem badge body.

Wherein, the totem individualized information includes a text, a sound, a short film, a picture or at least one URL website.

Wherein, the URL website is connected to a specific website.

Wherein, the mobile sensing device further has an input/output unit.

Wherein, the display unit is a touch screen.

DESCRIPTION OF THE PREFERRED EMBODIMENTS

The above and other objects, features and advantages of this disclosure will become apparent from the following detailed description taken with the accompanying drawings.

Figures 1, 1A:
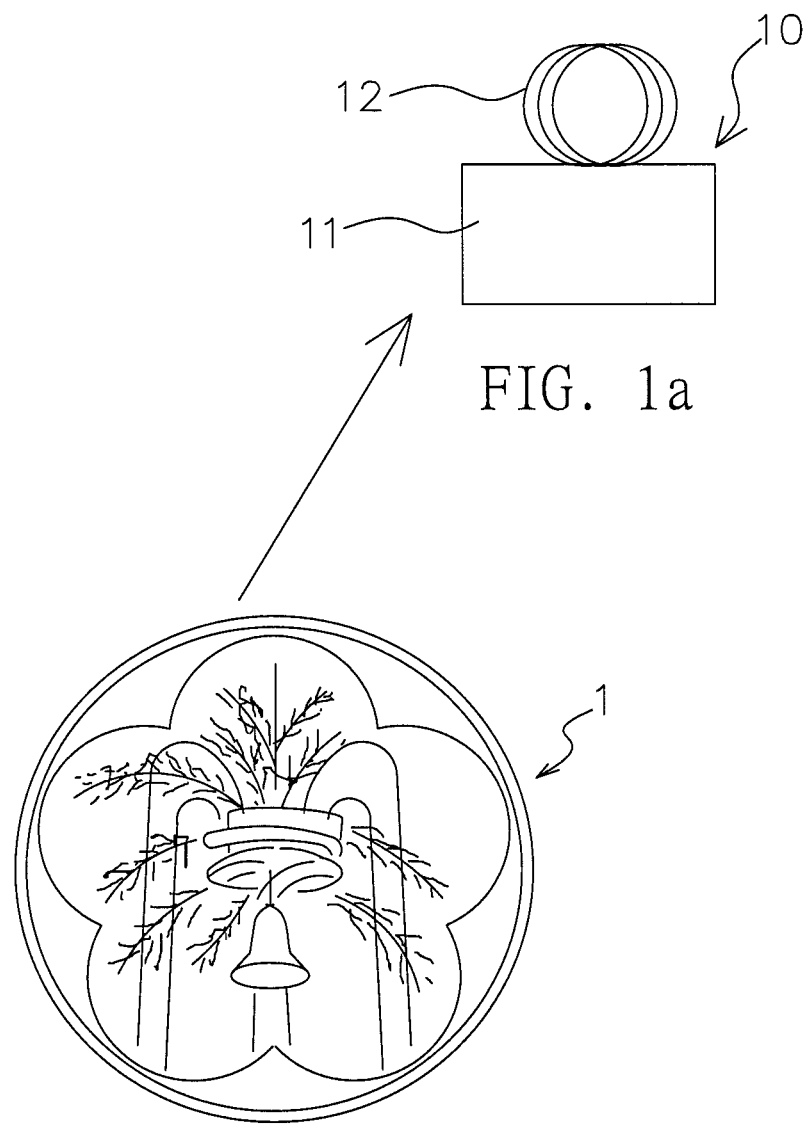
FIG. 1 is a schematic view of a totem badge body of the present invention.
FIG. 1a is a schematic view of an e-tag of the present invention.
Figure 2:
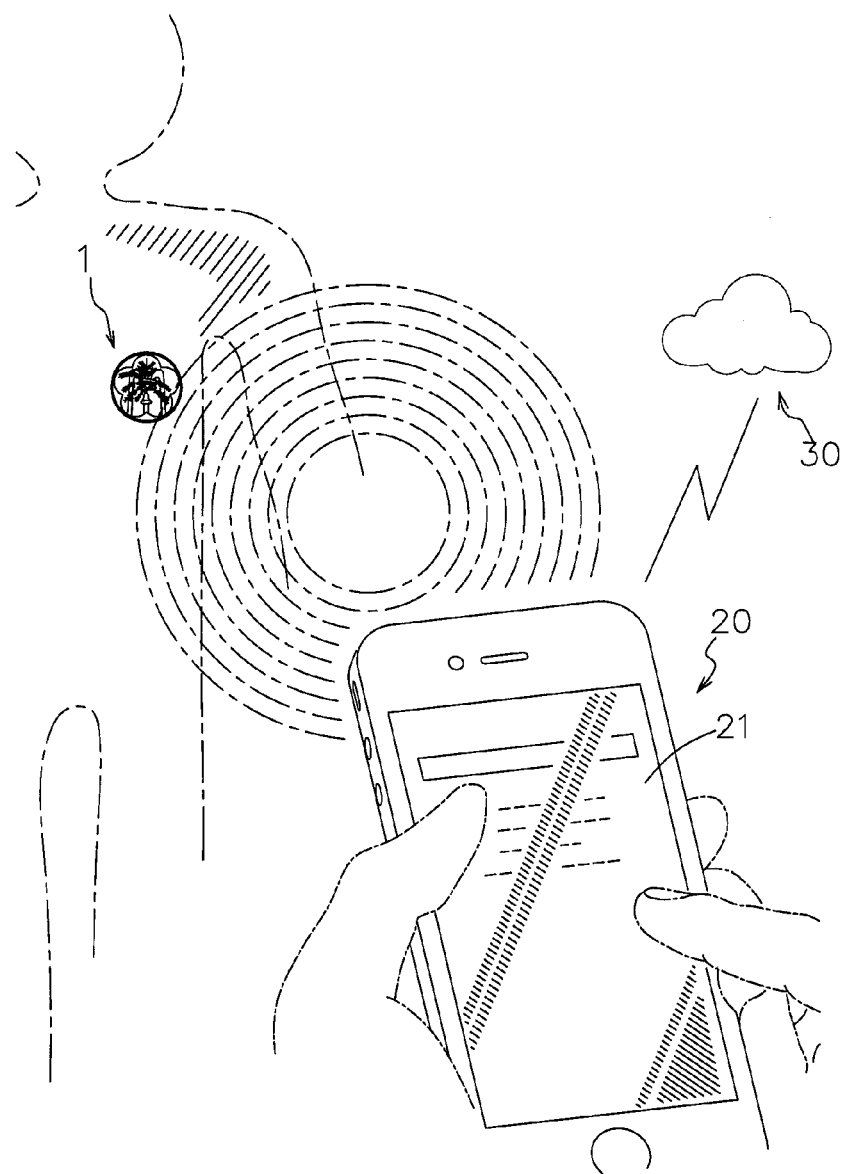
FIG. 2 is a schematic view of an application of the present invention.

With reference to FIGS. 1, 1a, and 2 of a sensory totem badge capable of transmitting individualized information in accordance with the present invention, the figures are provided for the purpose of illustration only, but the numerals, shapes, dimensions, and proportion are not limited by these figures in actual implementations. As shown in the figures, the sensory totem badge capable of transmitting individualized information of the present invention comprises: a totem badge body 1, attached or formed on an object surface. The totem badge body 1 has an e-tag 10 (or an NFC tag), and the e-tag 10 comprises an NFC chip 11 and an NFC coil 12.

A totem individualized information 31 is stored in the e-tag 10. In this embodiment, the "Fu Bell" badge showing one of the twelve major scenes of National Taiwan University (NTU) is used for example. When a user reads the e-tag 10 of the totem badge body 1 by a mobile sensing device 20, the totem individualized information 31 (Fu Bell is located at the center of the Royal Palm Boulevard, and it shows how much students miss and admire their principal Fu, Sinian about his scholarliness and respect and contribution to democracy and freedom) pre-recorded in the NFC chip 11 of the e-tag 10 is read. Therefore, the badge is given with an implication and the story behind the badge, and the badge has the uniqueness of transmitting individualized information, the convenience of receiving and displaying information, and the effect of improving the value and sense of technology of the badge effectively.

The mobile sensing device 20 may be a smart phone (or a flat PC, a smart wearable device, etc), and the mobile sensing device 20 has a display unit 21.

Figure 3:
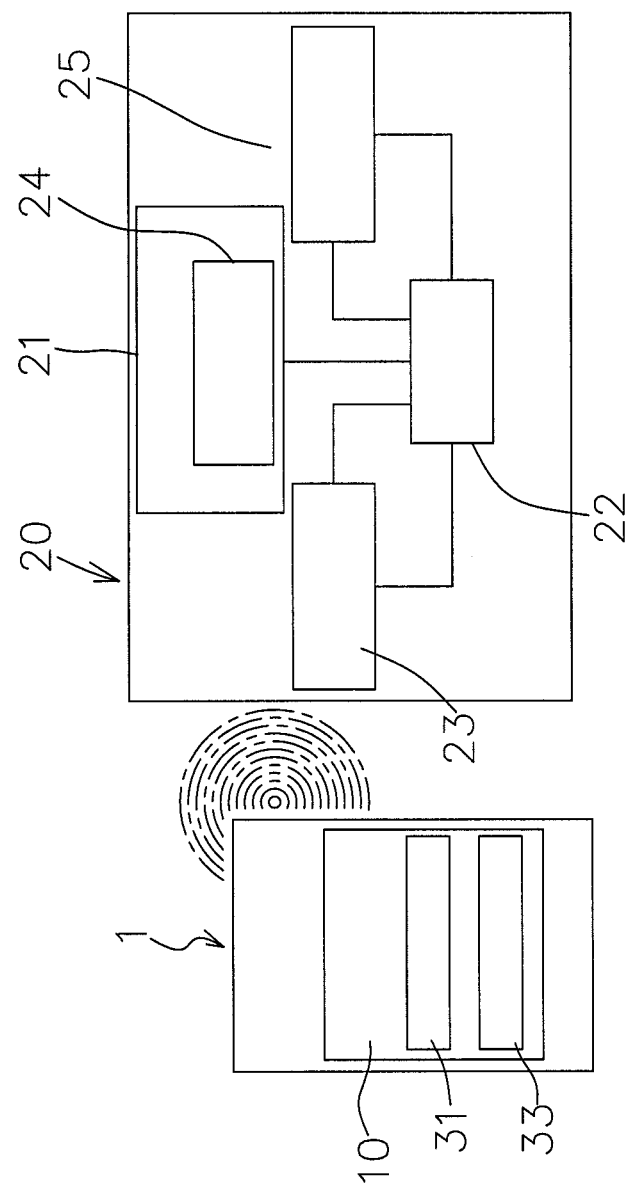
FIG. 3 is a schematic view of a first preferred embodiment of the present invention.

With reference to FIG. 3 for a sensory totem badge capable of transmitting individualized information in accordance with the first preferred embodiment of the present invention, the mobile sensing device 20 is provided for sensing and transmitting the content of the e-tag 10, and the mobile sensing device 20 comprises a display unit 21, a control unit 22, an NFC reading unit 23, an input/output unit 24 and a communication unit 25, wherein the display unit 21, the NFC reading unit 23, the input/output unit 24 and the communication unit 25 are electrically coupled to the control unit 22; the display unit 21 is a touch screen; and the communication unit 25 is a WiFi module or a mobile network module such as a 3G or 4G mobile network module.

Wherein, the totem badge body is in form of a sheet or directly stitched or sewed on an object.

Wherein, the e-tag further includes a private authentication module 33, and the private authentication module 33 requires a password inputted by the mobile sensing device 20 and a correct authentication before the content of the e-tag including the totem individualized information 31 can be read, so as to ensure the privacy and security of the individualized information.

Figure 4:
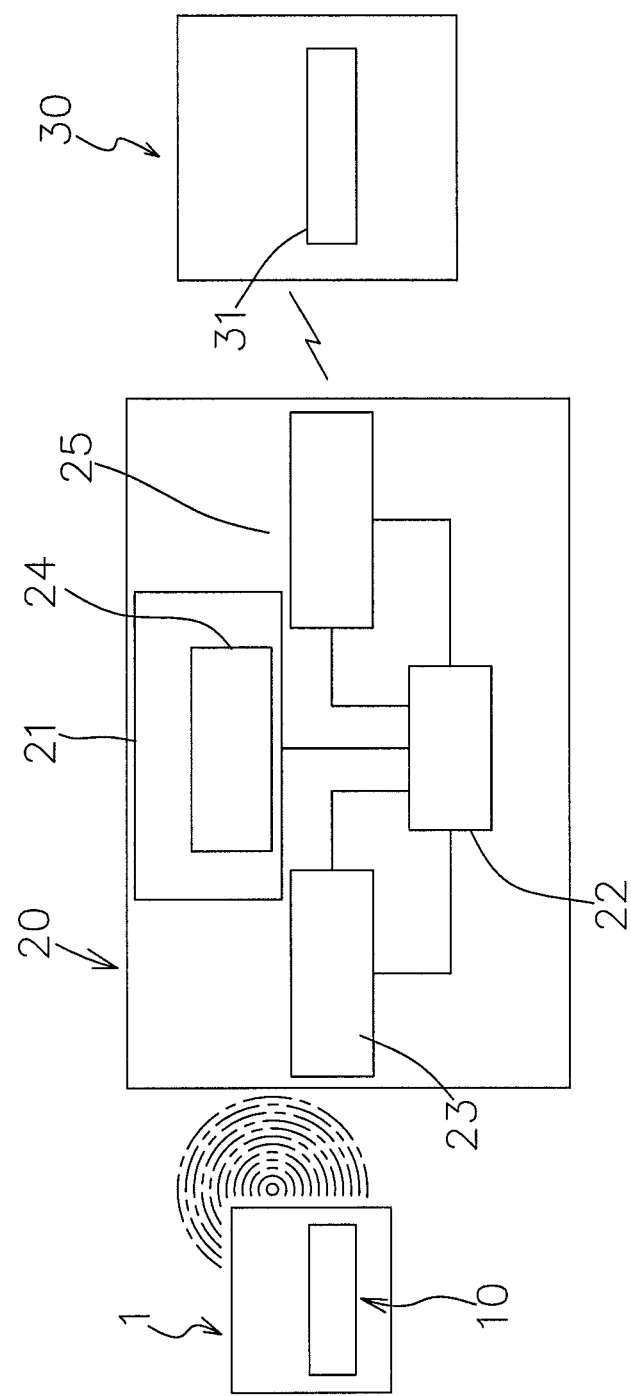
FIG. 4 is a schematic view of a second preferred embodiment of the present invention.

With reference to FIG. 4 for a sensory totem badge capable of transmitting totem individualized information in accordance with the second preferred embodiment of the present invention, this preferred embodiment is substantially the same as the first preferred embodiment except that the totem individualized information 31 of the second preferred embodiment is stored in a cloud server 30, and the cloud server 30 and the mobile sensing device 20 exchange information with each other via a wireless transmission, and at least one totem individualized information 31 corresponsive to the accessed authentication data of the e-tag 10 of the totem badge body 1 is stored in the cloud server 30, and the totem individualized information 31 is a text, a sound, a short film, a picture or an URL website intended to be transmitted by the gift sender, and the totem individualized information 31 is uploaded to the cloud server 30 after it is selected and inputted.

In the application of the sensory totem badge capable of transmitting individualized information of the present invention, a gift sender may input the pre-stored information into the e-tag by a mobile sensing device 20, and such information is the totem individualized information 31 including a text, a sound, a short film, a picture or an URL website; and the cloud server 30 may store the totem individualized information 31 such as a text, a sound, a short film, or a picture, and a specific website or the information of the cloud server 30 may be updated or supplemented at a later time.

After the totem badge body 1 is received, the mobile sensing device 20 may be placed near the totem badge body 1, so that the NFC reading unit 23 of the mobile sensing device 20 can sense the e-tag 10 of the totem badge body 1 and reads the totem individualized information 31 including a text, a sound, a short film, or a picture, and the display unit 21 is provided for displaying the content or the mobile sensing device 20 issues a sound. The gift recipient may put his/her mobile sensing device 20 near the totem badge body 1 to sense and read the totem individualized information 31 including the text, sound, short film, or picture stored in a specific website or a cloud server 30 through connecting the mobile sensing device 20 to the specific website (URL website) or the cloud server 30, and the display unit 21 is provided for displaying the content or the mobile sensing device 20 issues a sound.

Figure 5:
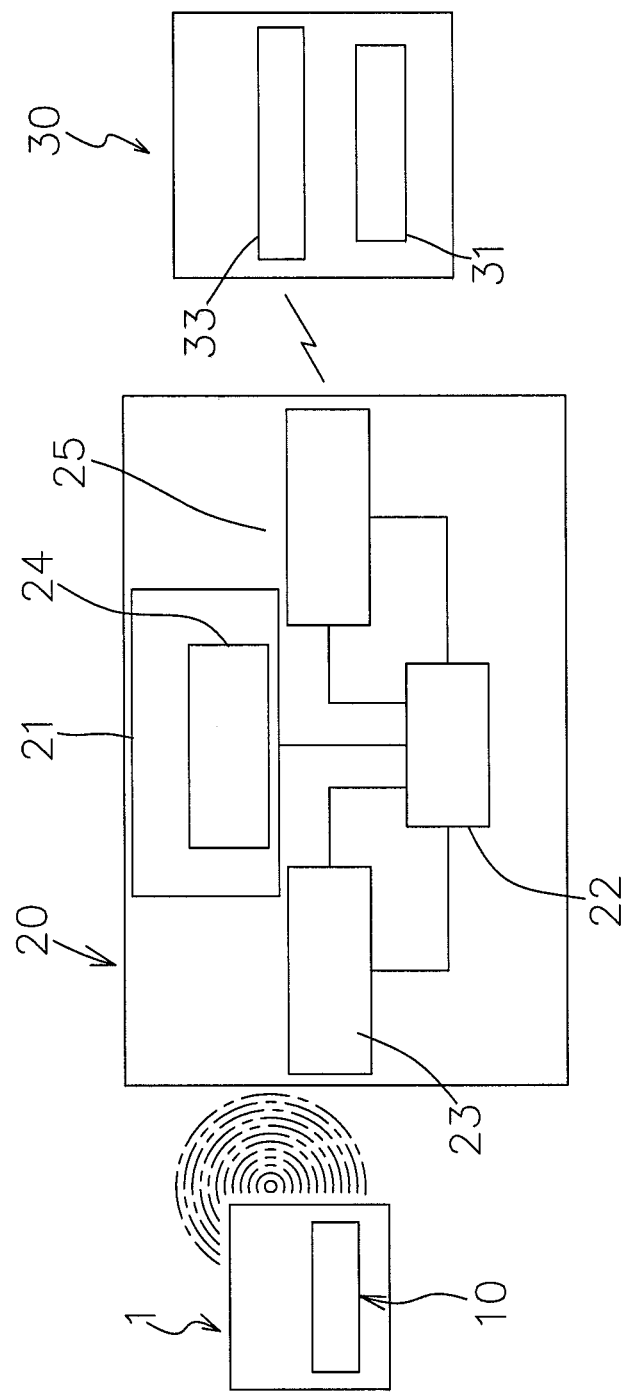
FIG. 5 is a schematic view of a third preferred embodiment of the present invention.

With reference to FIG. 5 for a sensory totem badge capable of transmitting individualized information in accordance with the third preferred embodiment of the present invention, this preferred embodiment is substantially the same as the second preferred embodiment and also comprises the totem badge body 1 and the e-tag 10, and the difference of these two preferred embodiments resides on that the cloud server 30 of the third preferred embodiment comprises a totem individualized information 31 and a private authentication module 33, and the private authentication module 33 requires a password inputted by the mobile sensing device 20 and a correct authentication before the content of the cloud server 30 including the totem individualized information 31 can be read. Therefore, when a recipient puts his/her mobile sensing device 20 near the totem badge body 1, the recipient requires to input a password to be transmitted to the cloud server 30 before the content of the cloud server 30 can be read, so as to ensure the privacy and security.

Figure 6:
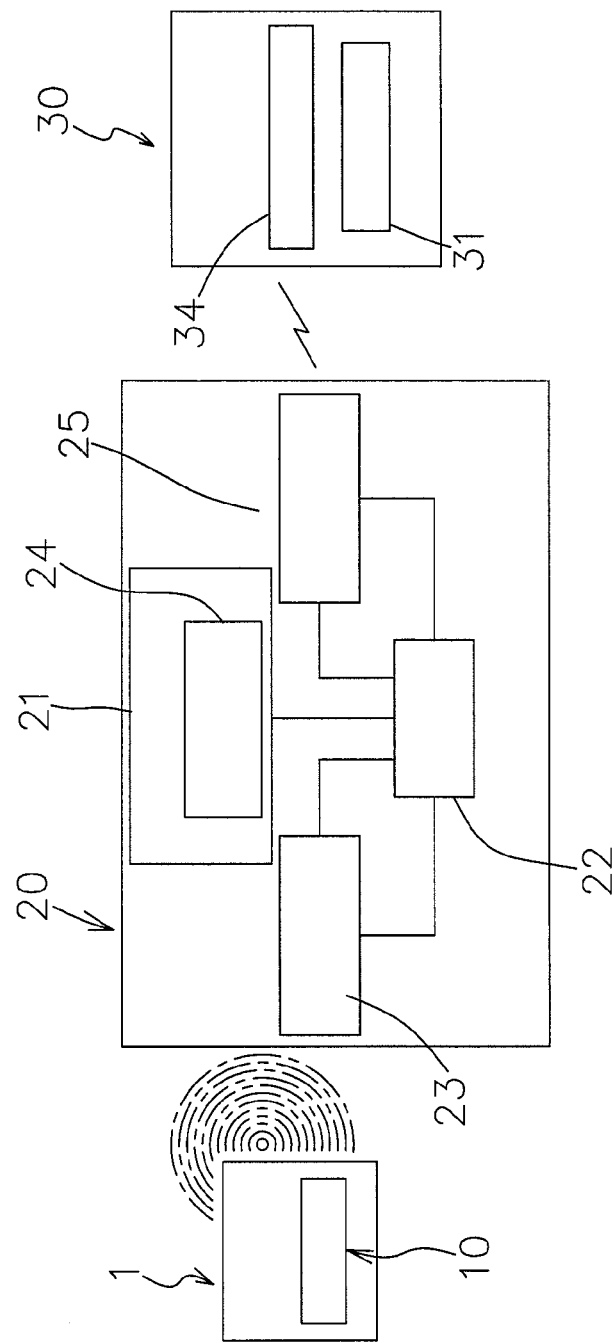
FIG. 6 is a schematic view of a fourth preferred embodiment of the present invention.

With reference to FIG. 6 for a sensory totem badge capable of transmitting individualized information in accordance with the fourth preferred embodiment of the present invention, this preferred embodiment is substantially the same as the second preferred embodiment, and both preferred embodiments comprise the totem badge body 1 and the e-tag 10, and the difference of the two preferred embodiments resides on that the cloud server 30 includes a totem individualized information 31 and a badge authentication module 34; and the badge authentication module 34 requires an authentication code transmitted from the mobile sensing device 20 and authenticated correctly before the related information provided by manufacturers and stored in the cloud server 30 or the totem individualized information 31 can be read. Therefore, when the recipient puts his/her mobile sensing device 20 near the totem badge body 1, the recipient requires to input an authentication code which is transmitted to the cloud server 30 before the content of the cloud server 30 can be read, and the authentication code may be used to determine whether the totem badge body is a product legally authorized or actually manufactured according to a gift sender's will, and this application has a very good effect on preventing limited or commemorative products from being forged or copied.

With the aforementioned assembly, the sensory totem badge capable of transmitting individualized information of the present invention is given with the meaning and uniqueness of the badge, the convenience of displaying information, and the context represented by the totem of the badge and the stories behind it. Further, a cloud device may be connected to the URL website to update information repeatedly, and the present invention further provides a confidentiality protection measure to the badge and the transmission channel of the badge wearer to prevent unauthorized persons to receive and read the individualized information, so as to achieve a better effect of privacy and security.

While the invention has been described by means of specific embodiments, numerous modifications and variations could be made thereto by those skilled in the art without departing from the scope and spirit of the invention set forth in the claims.

What is claimed is:

1. A sensory totem badge capable of transmitting individualized information, comprising:
   a totem badge body, formed, attached, or sewed onto an object surface;
   an e-tag, installed to the totem badge body, and comprising an NFC chip and an NFC coil; and
   a totem individualized information, stored in the e-tag;
   thereby, when a mobile sensing device reads the e-tag of the totem badge body, the totem individualized information pre-recorded and stored in the e-tag can be read.

2. The sensory totem badge capable of transmitting individualized information according to claim 1, wherein the totem badge body is in form of a sheet.

3. The sensory totem badge capable of transmitting individualized information according to claim 1, wherein the mobile sensing device comprises a control unit and a display unit, an NFC reading unit, and a communication unit which are electrically coupled to the control unit.

4. The sensory totem badge capable of transmitting individualized information according to claim 1, wherein the e-tag further comprises a private authentication module which requires a password inputted by the mobile sensing device and authenticated correctly before the content of the e-tag including the totem individualized information can be read.

5. The sensory totem badge capable of transmitting individualized information according to claim 1, wherein the totem badge body is a honorable badge representing a nation, a military badge, a team badge, or a contributory badge representing an organization.

6. A sensory totem badge capable of transmitting individualized information, comprising:
   a totem badge body, attached, sewed, or formed onto an object surface;
   an e-tag, installed to the totem badge body, and comprising an NFC chip and an NFC coil; and
   a totem individualized information, stored in a cloud server, and the cloud server having at least one individualized information corresponsive to access authentication data of the e-tag of the totem badge body;
   thereby, when a mobile sensing device reads the e-tag of the totem badge body, the totem individualized information pre-recorded and stored in the e-tag can be read.

7. The sensory totem badge capable of transmitting individualized information according to claim 6, wherein the totem badge body is in form of a sheet.

8. The sensory totem badge capable of transmitting individualized information according to claim 6, wherein the mobile sensing device comprises a control unit and a display unit, an NFC reading unit and a communication unit which are electrically coupled to the control unit.

9. The sensory totem badge capable of transmitting individualized information according to claim 6, wherein the cloud server further comprises a private authentication module for receiving and authenticating a password transmitted from the mobile sensing device.

10. The sensory totem badge capable of transmitting individualized information according to claim 6, wherein the cloud server further comprises a badge authentication module for receiving and authenticating an authentication code transmitted by the mobile sensing device.

11. The sensory totem badge capable of transmitting individualized information according to claim 6, wherein the communication unit is a WiFi module or a mobile network module including a 3G or 4G mobile network module.

12. The sensory totem badge capable of transmitting individualized information according to claim 6, wherein the totem individualized information includes a text, a sound, a short film, a picture, or at least one URL website.

13. The sensory totem badge capable of transmitting individualized information according to claim 12, wherein the URL website is connected to a specific website.

14. The sensory totem badge capable of transmitting individualized information according to claim 6, wherein the mobile sensing device further has an input/output unit.

15. The sensory totem badge capable of transmitting individualized information according to claim 6, wherein the display unit is a touch screen.

16. The sensory totem badge capable of transmitting individualized information according to claim 6, wherein totem badge body is a honorable badge representing a nation, a military badge, a team badge, or a contributory badge representing an organization.

* * * * *